United States Patent [19]

Tang

[11] Patent Number: 4,472,150
[45] Date of Patent: Sep. 18, 1984

[54] IN USE REPLACEABLE BEARING FOR OFFSHORE MOORING TERMINAL

[75] Inventor: Phillip H. Tang, Rosemead, Calif.
[73] Assignee: Amtel, Inc., Providence, R.I.
[21] Appl. No.: 13,227
[22] Filed: Feb. 21, 1979
[51] Int. Cl.³ .............................................. B63B 21/00
[52] U.S. Cl. ........................................ 441/5; 384/281
[58] Field of Search ...................... 308/23, 37, 70, 71, 308/15, 237 R, 238; 114/230, 264; 115/34 R; 9/8 P; 441/5

[56] References Cited

U.S. PATENT DOCUMENTS

| 3,130,991 | 4/1964 | Piragino | 308/238 |
| 3,317,254 | 5/1967 | Satterthwaite et al. | 308/238 |
| 4,025,131 | 5/1977 | Bergquist et al. | 308/62 |
| 4,148,107 | 4/1979 | Karl et al. | 9/8 P |

Primary Examiner—Trygve M. Blix
Assistant Examiner—Jesûs D. Sotelo
Attorney, Agent, or Firm—Freilich, Hornbaker, Rosen & Fernandez

[57] ABSTRACT

A heavy-duty slowly pivoting shaft and bearing system for an offshore mooring terminal, of a type which includes a heavy-duty shaft with opposite ends that are each rotatably mounted on a radial bearing assembly, wherein bearings at each of the assemblies can be removed while the shaft continues to be rotatably supported to permit its uninterrupted use. Each bearing assembly includes a housing arm with a hole that receives an end of the shaft, a main bearing lying near the outer end of the hole to permit its replacement by sliding it off an extreme end of the shaft, and an auxiliary bearing lying at the inner end of the hole near the middle of the shaft. The auxiliary bearing is formed in a plurality of segments that each extend by less than a half circle around the shaft, to permit the segments to be individually placed about the shaft and forced between the housing arm and shaft.

4 Claims, 6 Drawing Figures

IN USE REPLACEABLE BEARING FOR OFFSHORE MOORING TERMINAL

BACKGROUND OF THE INVENTION

Offshore mooring terminals typically utilize heavy-duty shafts in applications such as the connection of a buoy to a yoke that holds a dedicated storage vessel, the shaft permitting pitching of the vessel in rough seas without causing corresponding up and down movement of the buoy. The bearings that pivotally support the ends of the heavy-duty shaft on arms of a housing, sometimes require replacement. While each bearing that supports a corresponding end of the shaft, can be readily removed by slipping it off the end of the shaft, it is nevertheless difficult to replace a bearing in the field. This is because one end of the shaft will be unsupported during the time when the bearing is removed and the new one is ready to be installed. During this interval, damage to the structure can occur, such as to the shaft which is then supported only in a cantilevered fashion at one extreme end. Also, difficulty can then be encountered in trying to install the replacement bearing, since the shaft may not lie concentric with the bearing hole. Since the loads on the shaft may amount to many tons even during relatively calm weather, a worker cannot easily and safely manipulate the shaft to install a new bearing, or temporarily support the shaft to prevent it from bending when one of the bearings is removed. A bearing structure which enabled the replacement of a bearing that supported one end of a heavy-duty shaft, in a manner that assured continued rotational support of the shaft, would facilitate in-field repairs.

SUMMARY OF THE INVENTION

In accordance with one embodiment of the present invention, an in-use replaceable bearing apparatus is provided, which enables the replacement of a bearing lying at one end of a heavy-duty shaft whose opposite ends are rotatably supported, so as to enable the continued rotatable support of the shaft during the replacement. The bearing system includes a pair of housing arms with holes that receive the opposite ends of the heavy-duty shaft. A main bearing lies in each of the holes, in the space between a shaft and a housing arm, the mai bearing being removable by slipping it off a corresponding extreme end of the shaft. Each bearing assembly also includes an auxiliary bearing lying at the inner end of the housing hole, to at least temporarily support an end of the shaft when the main bearing is removed. The auxiliary bearing is formed in a plurality of segments, each extending by no more than one half circle about the shaft, to permit installation of each of the segments by laying it on the shaft and forcing it to slide into position in the hole of the housing arm. A group of elongated fasteners that are utilized to hold each auxiliary bearing segment in place, also can be utilized to force the bearing segment into the housing hole.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
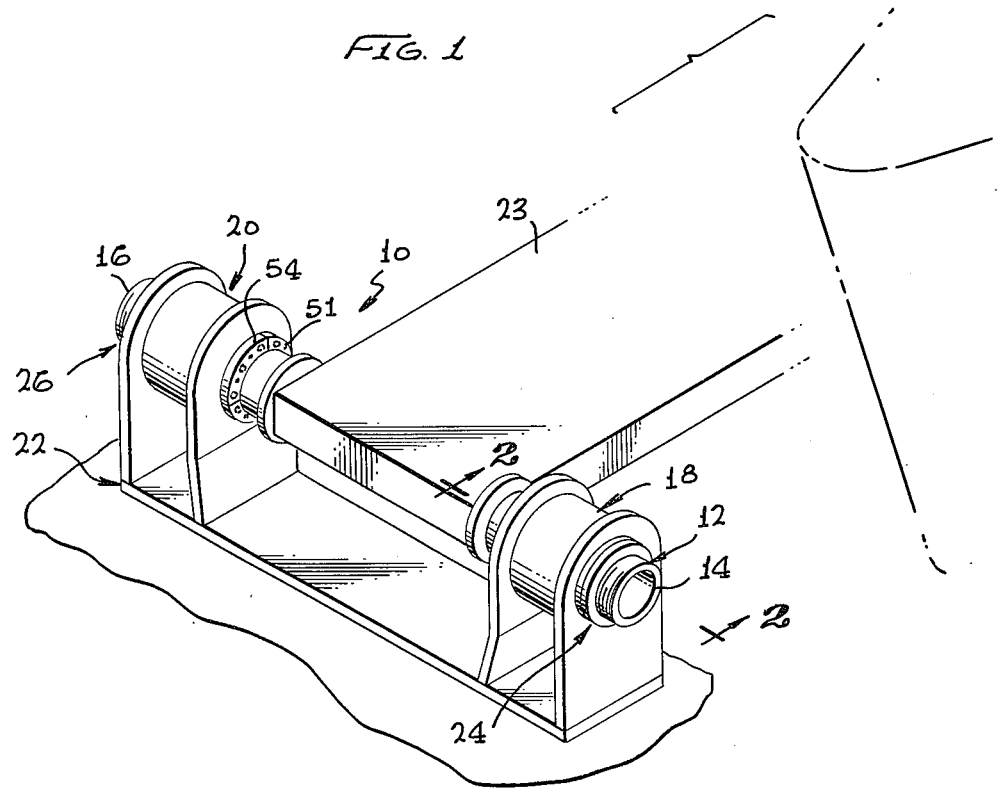
FIG. 1 is a partial perspective view of a bearing system constructed in accordance with the present invention.

FIG. 1 illustrates a bearing system 10 which includes a heavy-duty shaft 12 with opposite ends 14, 16 which are rotatably supported on the pedestals or arms 18, 20 of a housing 22. The bearing structure 10 is part of an offshore terminal, with the bearing 12 supporting a heavy-duty yoke 23 that extends to a storage vessel, while the housing 22 is mounted on a buoy. The shaft 12 rotates or pivots slowly, but can be heavily loaded by forces of many tens of tons, as the moored vessel is pulled away or pushed towards the buoy under the influence of waves and currents. A pair of bearing assemblies 24, 26 is disposed at each end of the shaft to pivotally support that shaft end of the corresponding housing arm. Each of the bearing assemblies is constructed to permit continued heavy-duty rotatable support of a shaft end during the replacement of a failed bearing of the assembly, so that repairs to the bearing assemblies can be performed in the field at minimal cost.

Figure 2:
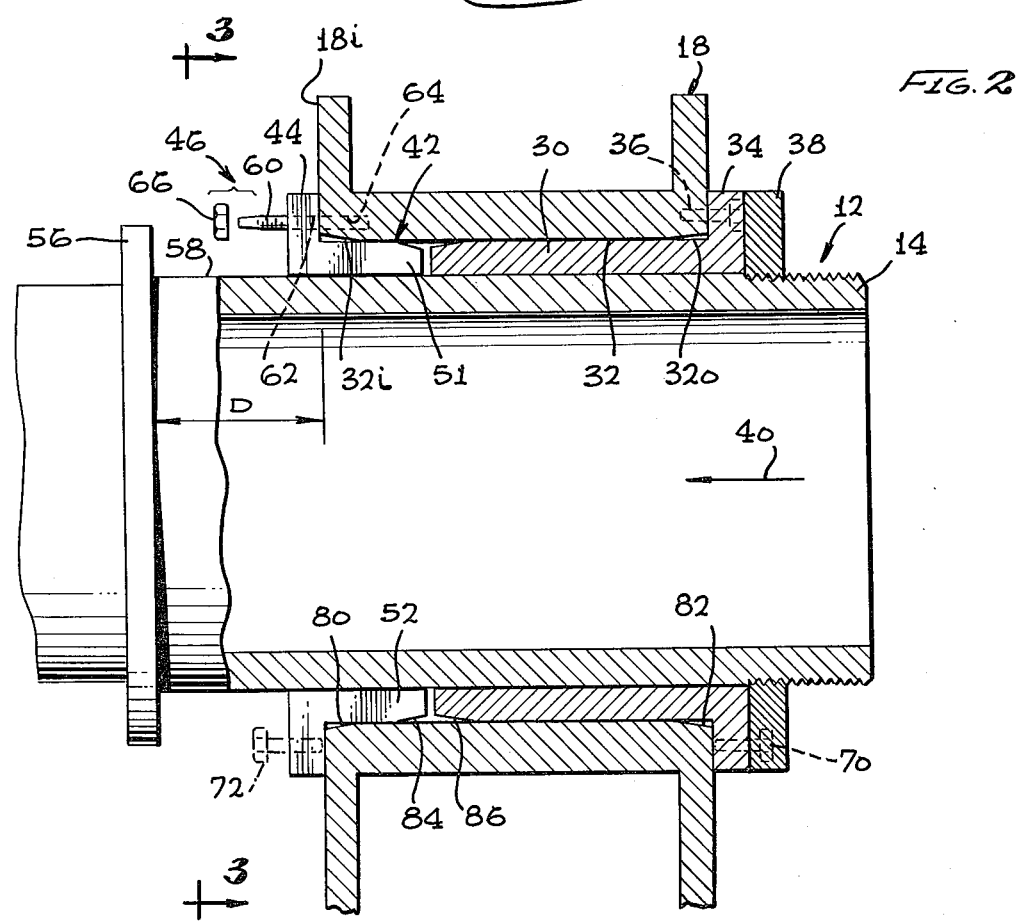
FIG. 2 is a view taken on the line 2—2 of FIG. 1.

As shown in FIG. 2, each bearing assembly such as 24 includes a main bearing 30 of cylindrical form, that lies in a hole 32 of the housing arm 18 and which surrounds the shaft end 14 to rotatably support it. The main bearing includes a flange 34 lying at the outer end 32o of the hole 32, which is the hole end that lies opposite the hole in the other arm 20. The flange 34 is fastened by a group of bolts 36 to the housing arm 18. It may be noted that a thrust ring 38 which is treadably mounted and keyed on the end 14 of the shaft, can bear against the bearing flange 34 to prevent axial movement of the shaft in the direction of arrow 40. The main bearing 30 can be constructed so that it alone can reliably support one end of the shaft 14 throughout the range of loads that may be encountered in use of the system.

Figure 3:
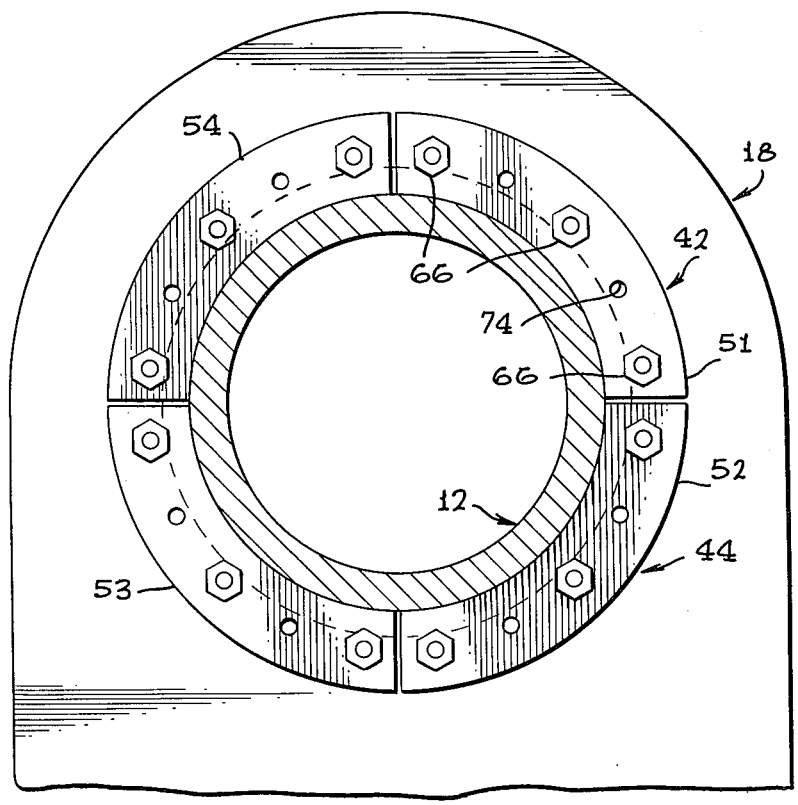
FIG. 3 is a view taken on the line 3—3 of FIG. 2.

The bearing assembly includes an auxiliary bearing 42 which lies at the inner end 18i of the housing arm and which is disposed within the hole and about the shaft to rotatably support the shaft end 14. The auxiliary bearing 42 has a flange 44 which lies against the inner end 18i of the housing arm, and may be fastened thereto by a group of fasteners 46. Although the main bearing 30 can be removed by slipping it off the end of the shaft while the shaft projects through the housing arm 18, the auxiliary bearing 42 cannot be removed in this manner since the housing arm 18 is in the way. To permit removal of the auxiliary bearing 42, it is constructed in the form of a plurality of segments. The particular bearing assembly as illustrated in FIG. 3, includes four bearing segments 51–54. To facilitate the installation of the bearing segments, the shaft 12 is formed so that the closest obstruction, which is the shaft flange 56 (FIG. 2) is spaced a distance D from the inner side 18*i* of the housing arm, by at least about the axial length of each of the auxiliary bearing segments such as 51.

The bearing system 10 can be allowed to function without the presence of the auxiliary bearing 42. When the main bearing 30 must be replaced, such as when it has worn excessively or has been damaged, the auxiliary bearing 42 may be installed prior to replacement of the main bearing. Each of the auxiliary bearing segments such as 51, can be installed by initially placing it on a clear shaft region 58 which lies immediately inside the housing arm 18. Then, three threaded studs 60 which form part of the fasteners 46, are projected through unthreaded holes 62 formed in the flange 44 of the bearing segment, and are threaded into threaded holes 64 formed in the housing arm 18. Nuts 66 of the fasteners 46, then can be threaded onto the studs 60 and screwed therealong to force the bearing segment such as 51 into the space between the housing arm hole 32 and the shaft. FIG. 3 shows three nuts 66 utilized to hold each bearing segment such as 51, and during the forcing of the bearing segment into the housing arm each of the nuts may be tightened a fraction of a turn at a time to gradually force in the segment. The studs 60 not only force in the bearing segment but also prevent it from rotating with the shaft.

After all four auxiliary bearing segments have been installed at the inner portion 32*i* of the housing arm hole, the main bearing 30 is removed. This is accomplished by first screwing off the thrust ring 38. Then, a group of removing bolts indicated at 70 (FIG. 2) are threadably installed in corresponding holes of the main bearing flange 34. The holes in the main bearing flange 34 that are designed to receive the removing bolts 70, are not in line with any corresponding holes in the housing arm 18, so that screwing in of the bolts 70 forces the main bearing to be retracted from the housing arm hole. Of course, long removing bolts can be utilized to withdraw the main bearing far enough until it can easily slide off the end of the shaft. A new main bearing can be installed by utilizing long studs similar to those shown at 60 for the auxiliary bearing, and after installation of the new main bearing such long studs can be replaced by the bolts 36.

In between the time when the previous main bearing 30 has been removed and the replacement main bearing has not yet been fully installed, the auxiliary bearing 42 supports the shaft end. Such support by the auxiliary bearing enables the offshore terminal to continue to be utilized, with the shaft 12 continuing to pivot and the yoke 24 continuing to pivotally connect the storage vessel to the buoy. In addition, the auxiliary bearing 42 maintains the shaft end 14 concentric with the housing arm hole 32, to prevent damage to the shaft and to keep the shaft centered in the hole so that the replacement main bearing can be readily installed. Of course, it is desirable to perform the replacement of a main bearing during relatively calm weather, when there is only slow and moderate rotation of the shaft 12 and it is under only low to moderate loads.

After a main bearing 30 has been replaced, the auxiliary bearing 42 may be allowed to remain in place indefinitely or may be immediately removed. If there is assurance that the auxiliary bearing will remain concentric with the main bearing, at all segments of the auxiliary bearing, so as to avoid interference between the two bearings, then the auxiliary bearing can be allowed to remain indefinitely. However, even then there is a possibility that the auxiliary bearing may be damaged and will have to be replaced. The replacement of any segment of the auxiliary bearing can be accomplished by removing the three nuts 66 and installing a pair of removing bolts 72 (FIG. 2) in a pair of additional holes 74 formed in each segment. Tightening of the removing bolts 72 which are threadably installed in the threaded holes 74 of the segment, causes retraction of the segment from the housing arm hole.

Figure 4:
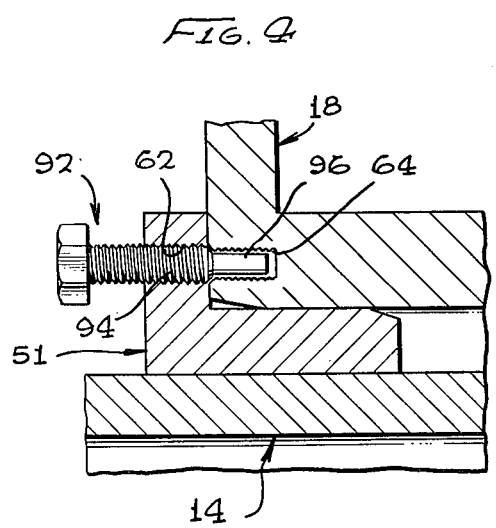
FIG. 4 is a partial sectional view of the bearing structure constructed in accordance with another embodiment of the invention, showing a fastener structure which can be utilized in the removal of an auxiliary bearing segment.
Figure 5:
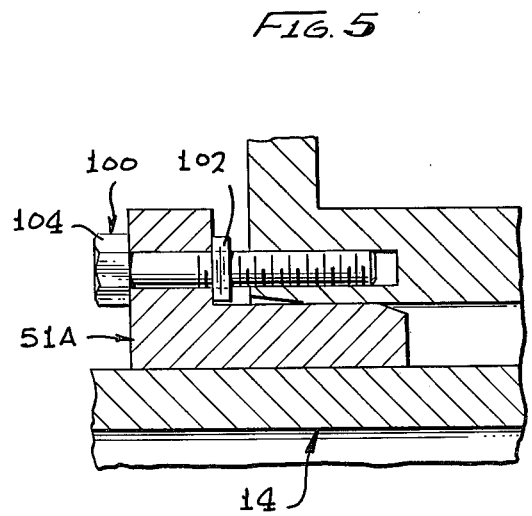
FIG. 5 is a partial sectional view of a bearing system constructed in accordance with another embodiment of the invention, which utilizes a trapped fastener for both installation and removal of an auxiliary bearing segment.
Figure 6:
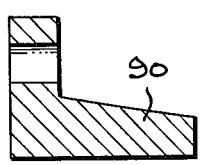
FIG. 6 is a partial sectional view of an auxiliary bearing segment constructed in accordance with another embodiment of the invention.

In order to facilitate the installation of the main bearing 30 and of each segment of the auxiliary bearing 42, the walls of the housing arm hole 32 are tapered at their inner and outer ends at 80 and 82, and the auxiliary bearing segments and main bearing are tapered at their ends 84, 86. Somewhat easier installation of the auxiliary bearing can be achieved by tapering the inner end of the hole 32 along a considerable length, or by tapering the auxiliary bearing segments as shown at 90 in FIG. 6, along substantially their entire length. The removing bolts for removing the auxiliary bearing, can be constructed as shown in FIG. 4, so that each bolt 92 has a portion 94 threadably engaged with one of the holes 62 in the auxiliary bearing, and has a reduced diameter end 96 that is freely rotatable within a hole 64 in the housing arm 18. This enables removal of the bearing segment such as 51, by first removing the nuts and studs 66, 60, and then installing a bolt 92 in their place. A convenient but somewhat more costly construction is shown in FIG. 5, wherein a captured bolt 100 is utilized to both install and remove a bearing segment 51A. The captured bolt 100 has a portion 102 opposite the head 104 of the bolt, so that the bolt can be utilized to push in or withdraw the bearing segment.

Thus, the invention provides a bearing system which is especially useful for offshore terminals wherein slowly rotating but very heavily loaded shafts are utilized, to facilitate the replacement of a worn or damaged bearing in the field. The replacement of a damaged bearing that supports one end of a shaft whose opposite ends are supported by a pair of housing arms, and wherein the main bearing at each end of the shaft can be removed by slipping it off the extreme end of the shaft, is facilitated by the use of an auxiliary bearing which can be installed at the inner end of the housing arm hole. The auxiliary bearing is formed in a plurality of segments, each segment extending by no more than 180° about the shaft to facilitate its installation by laying it on the shaft and forcing it into the housing arm hole. A cleared area is provided immediately within the housing arm, to receive the auxiliary bearing segments and enable their movement in the substantially axial direction along the shaft for installation. It may be noted that the shaft may sometimes be the relatively stationary member while the housing and the two housing arms at the end of the shaft may constitute the pivoting element in the bearing system, and either arrangement can utilize the segmented auxiliary bearing arrangement of the invention.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In an offshore mooring terminal designed to lie in a body of water, and which includes a heavy duty shaft with opposite ends which each extend within a different one of a pair of holes of a housing, the improvement of a pair of bearing assemblies for pivotally supporting the shaft ends to the housing, wherein at least one of the bearing assemblies includes:
   a first annular bearing lying in a first of said housing holes and around said shaft, at an outer end of said first hole which lies opposite the other housing hole; and
   a second annular bearing lying in said first housing hole and around said shaft at an inner end of said first housing hole which lies opposite said outer end thereof, said second bearing including a plurality of sections each extending by a fraction of a full circle about the axis of the shaft, and said second bearing being capable of at least temporarily supporting an end of said shaft without the first bearing, whereby to enable replacement of a bearing in service.

2. The improvement described in claim 1 wherein:
   each second bearing section includes a cylindrical portion and an outwardly extending flange which has at least one rod-receiving hole therein; and including
   a plurality of rods projecting in an axial direction from said housing portion to project into said flange holes, the rods being long enough to capture the bearing sections to prevent their rotation with the shaft and to guide the bearing sections as they are advanced into position in the first housing hole and closely around the shaft.

3. The improvement described in claim 2 wherein:
   said rods are threaded; and including
   a plurality of nuts which can be threaded onto said rods and turned to press said bearing sections into place between a shaft end and the housing.

4. The improvement described in claim 1 wherein:
   said shaft has an uncovered region immediately inside said first housing end, which is at least about as long as said bearing segments, whereby to enable the bearing segments to be laid on the uncovered region prior to advancement into the housing hole.

* * * * *